US008463432B2

(12) United States Patent
Weinshenker

(10) Patent No.: US 8,463,432 B2
(45) Date of Patent: Jun. 11, 2013

(54) SELF-SERVICE MEDIA RENTAL TERMINAL AND METHOD OF OPERATING A SELF-SERVICE MEDIA RENTAL TERMINAL HAVING A PLURALITY OF CUSTOMER INTERFACES

(75) Inventor: Bradley E. Weinshenker, Bartlett, IL (US)

(73) Assignee: NCR Corporation, Duluth, GA (US)

( * ) Notice: Subject to any disclaimer, the term of this patent is extended or adjusted under 35 U.S.C. 154(b) by 221 days.

(21) Appl. No.: 12/641,703

(22) Filed: Dec. 18, 2009

(65) Prior Publication Data

US 2011/0153067 A1 Jun. 23, 2011

(51) Int. Cl.
*G06F 17/00* (2006.01)

(52) U.S. Cl.
USPC ............................ 700/242; 700/236; 700/237

(58) Field of Classification Search
USPC .......................... 700/231, 232, 236, 237, 242
See application file for complete search history.

(56) References Cited

U.S. PATENT DOCUMENTS 4,814,592 A * 3/1989 Bradt et al. .................... 700/236
5,042,686 A * 8/1991 Stucki ............................. 221/13
7,218,991 B2 * 5/2007 Walker et al. ................. 700/234
7,234,609 B2 * 6/2007 DeLazzer et al. ............... 221/10
8,036,774 B2 10/2011 Blust et al.
2004/0254676 A1 * 12/2004 Blust et al. .................... 700/231

OTHER PUBLICATIONS http://www.moviebankusa.com/customers/105050310462333/filemanager/MovieBankUSA.pdf.

* cited by examiner

*Primary Examiner* — Timothy Waggoner
(74) *Attorney, Agent, or Firm* — Michael Chan; Peter H. Priest

(57) ABSTRACT

A self-service entertainment media rental terminal comprises a first customer interface for enabling a first customer to interact with the terminal to rent a media item on which entertainment data is stored from the terminal, a second customer interface for enabling a second customer to interact with the terminal to return a media item on which entertainment data is stored to the terminal, a media storage bin for (i) storing media items to be dispensed when a customer rents a media item, and (ii) storing media items which have been returned from a customer, a media transport mechanism arranged to (i) support movement of media items between the media storage bin and the first customer interface, and (ii) support movement of media items between the media storage bin and the second customer interface, and a controller arranged to (i) receive customer input data through the first customer interface, (ii) receive customer input data through the second customer interface while customer input data is being received through the first customer interface, and (iii) control operation of the media transport mechanism based upon the customer input data received through the first customer interface and customer input data received through the second customer interface.

15 Claims, 4 Drawing Sheets

SELF-SERVICE MEDIA RENTAL TERMINAL AND METHOD OF OPERATING A SELF-SERVICE MEDIA RENTAL TERMINAL HAVING A PLURALITY OF CUSTOMER INTERFACES

BACKGROUND

The present invention relates to media on which entertainment data is stored, such as a digital versatile disc ("DVD"), and is particularly directed to a self-service media rental terminal and method of operating a self-service media rental terminal having a plurality of customer interfaces.

A typical self-service media rental terminal for renting DVDs is capable of both dispensing a rented DVD to a customer and receiving a returned DVD from a customer. The self-service media rental terminal has a customer interface by which a customer interacts with the terminal to rent DVDs and return DVDs. A drawback in known self-service media rental terminals which are capable of both dispensing rented DVDs and receiving returned DVDs is that a customer who just wants to return a DVD has to wait in a queue with other customers who want to rent (or both rent and return) DVDs at the terminal. This wait in a queue may be quite frustrating for the customer who just wants to return a DVD, especially if the queue is relatively long. It would be desirable to provide an improved way for a customer who just wants to return a DVD.

SUMMARY

In accordance with one embodiment of the present invention, a self-service entertainment media rental terminal comprises a first customer interface for enabling a first customer to interact with the terminal to rent a media item on which entertainment data is stored from the terminal, a second customer interface for enabling a second customer to interact with the terminal to return a media item on which entertainment data is stored to the terminal, a media storage bin for (i) storing media items to be dispensed when a customer rents a media item, and (ii) storing media items which have been returned from a customer, a media transport mechanism arranged to (i) support movement of media items between the media storage bin and the first customer interface, and (ii) support movement of media items between the media storage bin and the second customer interface, and a controller arranged to (i) receive customer input data through the first customer interface, (ii) receive customer input data through the second customer interface while customer input data is being received through the first customer interface, and (iii) control operation of the media transport mechanism based upon the customer input data received through the first customer interface and customer input data received through the second customer interface.

DETAILED DESCRIPTION

The present invention relates to media on which entertainment data is stored, such as a digital versatile disc ("DVD"), and is particularly directed to a self-service media rental terminal and method of operating a self-service media rental terminal having a plurality of customer interfaces.

Figure 1:
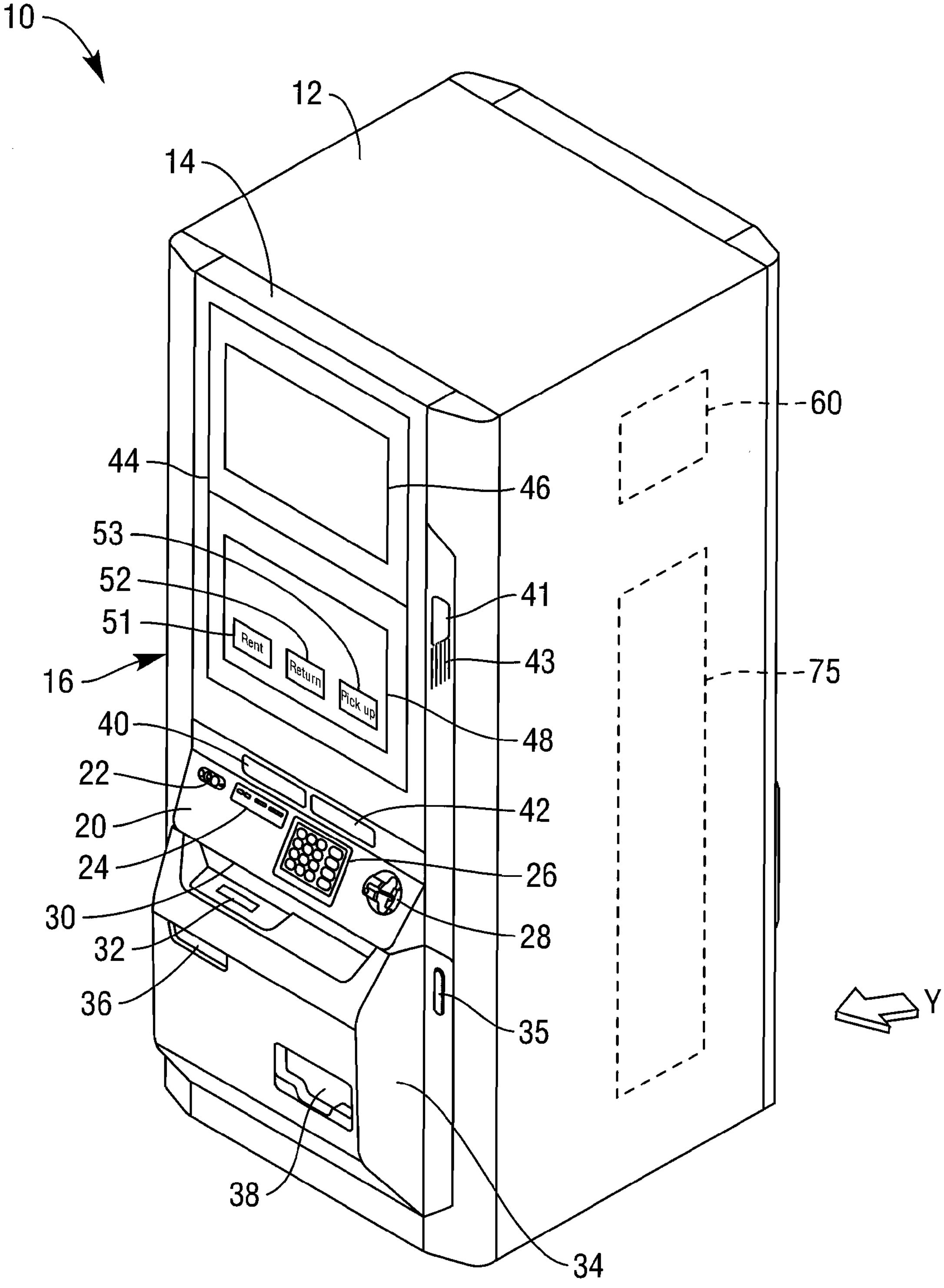
FIG. 1 is a right-front perspective view of a self-service media rental terminal which is constructed in accordance with one embodiment of the present invention.

Referring to FIG. 1, a self-service media rental terminal 10 constructed in accordance with one embodiment of the present invention is illustrated. The self-service return terminal 10 comprises an exterior enclosure 12 which has a front panel 14 by which a first customer interface 16 is provided. The first customer interface 16 includes a user interface panel 20 having an audio jack 22, a digital download port 24, an encrypted key pad 26, and a magnetic stripe reader 28. The digital download port includes a number different electronic ports through which digital data can be downloaded from the terminal 10 to a media storage device such as a Universal Serial Bus (USB) card, a SD card, or the like.

A first radio frequency identification (RFID) reader 30 is located in an area just underneath the user interface panel 20. A first fixed label 32 is located adjacent to the first RFID reader 30. The first fixed label 32 is marked "PLEASE SCAN DISC HERE" is disposed on a platform-like area of a first lower access panel 34. The first lower access panel 34 may be in the form of a door which can be locked using first lock mechanism 35.

A receipt output slot 36 is disposed on the first lower access panel 34. The receipt output slot 36 is provided as an opening through which a transaction receipt can be dispensed from a receipt printer (not shown) after a customer has completed either a rental transaction or a return transaction (or both) at the terminal 10. Also, a bare disc (i.e., a disc which is not in a disc case) envelope printer/dispenser output slot 38 is disposed on the first lower access panel 34. The bare disc envelope printer/dispenser slot 38 is provided as an opening through which an envelope for a bare disc can be dispensed.

A bare DVD transporter (not shown) has a slot which is aligned with a first shuttered opening 40. A cased DVD transporter (also not shown) has a slot which is aligned with a second shuttered opening 42. The bare DVD transporter and the cased DVD transporter are located on the front panel 14 just above the user interface panel 20. Structure and operation of the bare DVD transporter and the cased DVD transporter are known and, therefore, will not be described further. Also, a camera 41 and a speaker 43 are located on the front panel 14.

A first display 44 which may be in the form of a liquid crystal display (LCD) is configured to present a single display screen or a dual display screen such as shown in FIG. 1. The dual display screen shown in FIG. 1 comprises an upper display screen 46 and a lower display screen 48. The upper display screen 46 may be used to display non-transaction information such as advertisements or the like. The lower display screen 48 is used to display transaction-related information to allow a customer to interact with the first customer interface 16 to conduct a rental transaction or a return transaction. Although upper and lower display screens 46, 48 are shown in FIG. 1 as being on a single physical display, it is conceivable that each display screen be on its own separate physical display.

As shown in FIG. 1, the lower display screen 48 shows three touch-screen selectable choices 51, 52, 53 which can be made by a customer who is using the first customer interface 16 to conduct a transaction. The choice 51 allows a customer to rent a DVD from the terminal 10. The choice 52 allows a customer to return a DVD to the terminal 10. The choice 53 allows customer to pickup a pre-reserved DVD from the terminal 10. A controller 60 is located inside the enclosure 12, and is shown in dotted line in FIG. 1. The controller 60 may be any suitable type of electronic processor, microcomputer, or the like. The controller 60 controls operation of the terminal 10, as will be described later.

A media transport mechanism 75 is located inside the enclosure 12 and includes a number of media storage bins (not shown). The media transport mechanism 75 is shown in dotted line in FIG. 1. The media storage bins store DVDs to be dispensed when DVDs are rented to customers. The media storage bins also receive and store DVDs which have been returned from customers. The media transport mechanism 75 is arranged to (i) support movement of media items between the media storage bins and the first customer interface 16, and (ii) support movement of media items between the media storage bins and the second customer interface 66. The media transport mechanism 75 may comprise any suitable mechanism which is capable of transporting media items between the media storage bins and the first customer interface 16 and between the media storage bins and the second customer interface 66. One suitable mechanism is the retrieval system disclosed in U.S. application Ser. No. 10/866,387, filed Jun. 11, 2004, a divisional of U.S. application Ser. No. 12/328,388 which has now issued as U.S. Pat. No. 8,036,774, the disclosure of which is hereby incorporated by reference.

Figure 2:
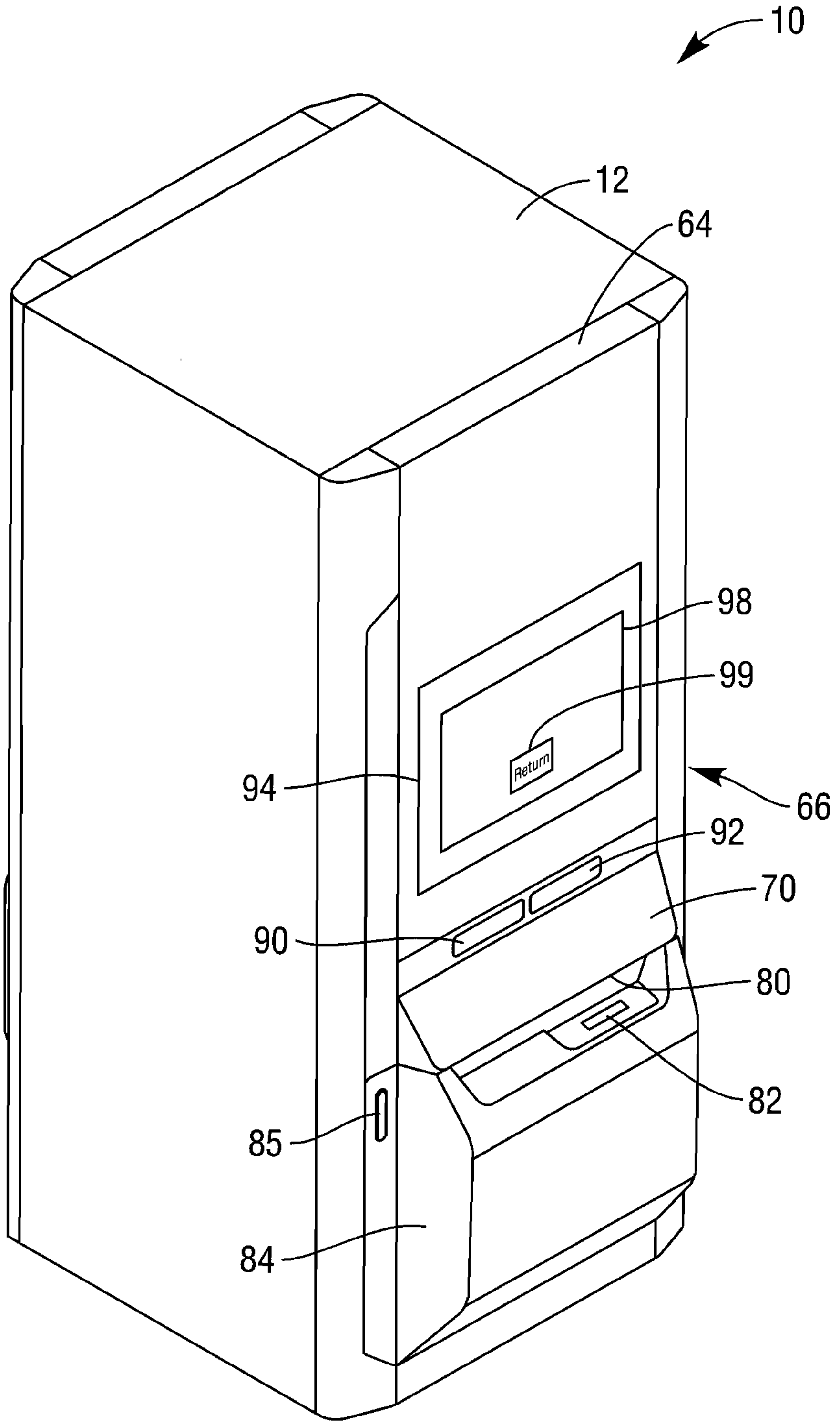
FIG. 2 is an perspective view, looking approximately in the direction of arrow "Y" in FIG. 1, and showing a left-back perspective view of the self-service media rental terminal.

Referring to FIG. 2, a perspective view, looking approximately in the direction of arrow "Y" in FIG. 1, is illustrated. More specifically, FIG. 2 shows a left-back perspective view of the self-service media rental terminal 10. As shown in FIG. 2, the enclosure 12 has a rear panel 64 through which a second customer interface 66 is provided. The second customer interface 66 comprises a reduced-functionality, customer interface. The second customer interface 66 is a reduced-functionality customer interface in that it may include some or none of the components of the relatively full-featured, first customer interface 16 on the front panel 14 of the terminal 10. For example, as shown in FIG. 2, a reduced-functionality, user interface panel 70 has none of the components of the relatively full-featured, user interface panel 20 on the front panel 14 of the terminal 10. The relatively full-featured, user interface panel 20 has a predetermined functionality, and the reduced-functionality, user interface panel 70 has less than the predetermined functionality.

As shown in FIG. 2, a second RFID reader 80 is located in an area just underneath the user interface panel 70. A second fixed label 82 is located adjacent to the second RFID reader 80. The second fixed label 82 is marked "PLEASE SCAN DISC HERE" is disposed on a platform-like area of a second lower access panel 84. The second lower access panel 84 may be in the form of a door which can be locked using second lock mechanism 85.

A bare DVD transporter (not shown) has a slot which is aligned with a third shuttered opening 90. A cased DVD transporter (also not shown) has a slot which is aligned with a fourth shuttered opening 92. The bare DVD transporter and the cased DVD transporter are located on the rear panel 64 just above the user interface panel 70.

A second display 94 which may be in the form of a liquid crystal display (LCD) is configured to present a simplified display screen 98 such as shown in FIG. 2. Simplified display screen 98 is used to display transaction-related information to allow a customer to interact with the second customer interface 66 to conduct only limited transactions at the terminal 10. As shown in FIG. 2, the simplified display screen 98 shows only one touch-screen selectable choice 99 which can be made by a customer who is using the second customer interface 66 to conduct a transaction. The choice 99 allows a customer to return a DVD to the terminal 10. No other choices are available on the example simplified display screen 98 shown in FIG. 2.

Figure 3:
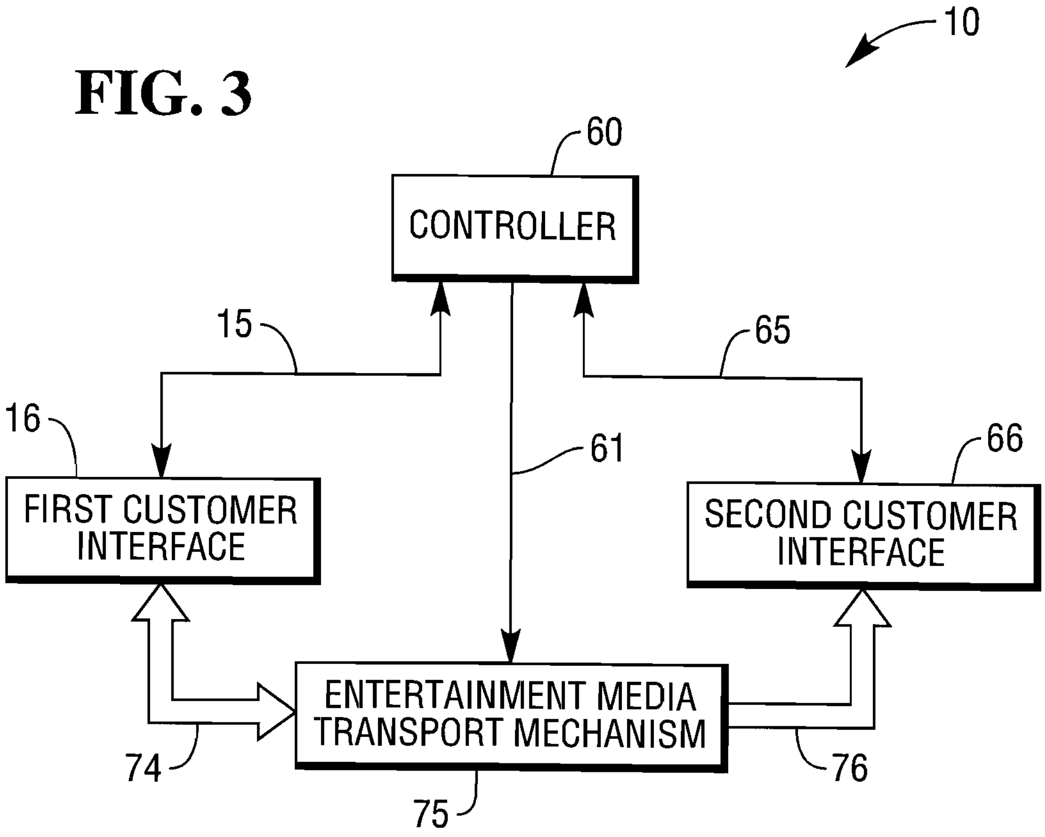
FIG. 3 is a schematic block representation of the self-service media rental terminal of FIG. 1.

Referring to FIG. 3, a schematic block representation of the self-service media rental terminal of FIG. 1 is illustrated. As shown in FIG. 3, the media transport mechanism 75 support movement of media items between media storage bins and the first customer interface 16, as shown by arrowline 74. The media transport mechanism 75 also supports movement of media items between the media storage bins and the second customer interface 66, as shown by arrowline 76. The controller 60 sends signals to and receives signals from the first customer interface 16 on line 15. The controller 60 sends signals to and receives signals from the second customer interface 16 on line 65. The controller 60 controls operation of the media transport mechanism 75 on line 61 based upon customer input data received from a customer through the first customer interface 16 and customer input data received from another customer through the second customer interface 66.

Referring to flow diagram 100 of FIG. 4, a typical operation of the self-service media rental terminal 10 will now be described. In this example scenario, three customers are described. A first customer uses the first customer interface 16 to conduct a rental-only transaction. A second customer uses the second customer interface 66 to conduct a return-only transaction. A third customer also uses the second customer interface 66 to conduct a pickup-only transaction.

Figure 4:
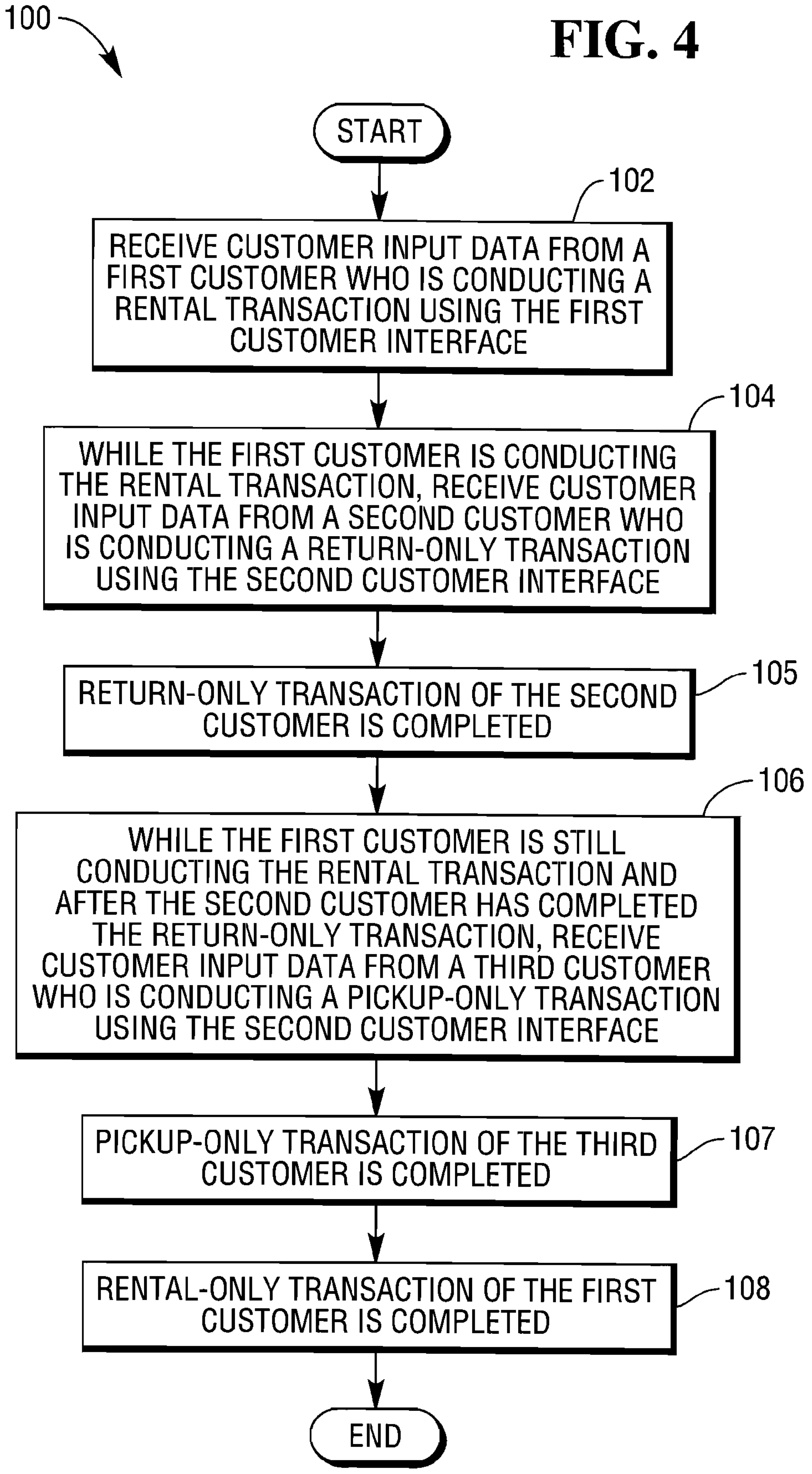
FIG. 4 is a flow diagram which depicts typical operation of the self-service media rental terminal of FIG. 1.

As shown in step 102 of FIG. 4, the terminal 10 receives customer input data via the first customer interface 16 from the first customer when the first customer interacts with the first customer interface 16 and provides rental-only input data associated with the particular rental transaction. Then, as shown in step 104, the terminal 10 receives customer input data via the second customer interface 66 from the second customer when the second customer interacts with the second customer interface 66 and provides return-only input data associated with the particular return transaction. The terminal 10 is receiving customer input data from the second customer while customer input data from the first customer is being received.

In this example scenario, it is assumed that the second customer completes the return-only transaction and a third customer arrives at the terminal and begins to conduct a pickup-only transaction before the first customer completes the rental-only transaction. Accordingly, as shown in step 105, the return-only transaction of the second customer ends. Then, as shown in step 106, the terminal 10 receives customer input data via the second customer interface 66 from the third customer when the third customer interacts with the second customer interface 66 and provides pickup-only input data associated with the particular pickup-only transaction. The terminal 10 is receiving customer input data from the third customer at the same time customer input data from the first customer is being received since the first customer has not yet completed the rental-only transaction. Then, as shown in step 107, the pickup-only transaction of the third customer ends. And then eventually, as shown in step 108, the rental-only transaction of the first customer ends.

It should be apparent that the self-service media rental terminal 10 described hereinabove provides a single-integrated unit which allows more than one customer to interact with the terminal at the same time. The single-integrated unit occupies a relatively narrow footprint. The single-integrated unit also allows the returned inventory of DVDs (which have been received via the first interface 16 or the second interface 18) to be immediately available for rental by another customer.

It should also be apparent that the first interface 16 has full functionality in that it allows a first customer to either rent or return (or both rent and return) DVDs. The second interface 18 has reduced functionality in that it allows a second customer who is different from the first customer to only return DVDs. A customer who just wants to return a DVD need not have to wait in line with other customers who want to either rent or both rent and return DVDs. Accordingly, a customer just wanting to return a DVD (or perhaps just wanting to pickup a pre-reserved DVD in another embodiment) is able to do so quickly without having to wait in line with customers who want to either rent or both rent and return DVDs.

Although the above-description describes the first customer interface 16 as allowing a customer to rent, return, or pickup DVDs and the second customer interface 66 as allowing a customer to only return DVDs, it is conceivable that other combinations for a full-featured customer interface and a reduced-featured customer interface are possible. As an example, it is conceivable that the first customer interface 16 allows a customer to rent or return DVDs and the second customer allows a customer to only return DVDs. As another example, it is conceivable that the first customer interface 16 allows a customer to rent, return, or pickup DVDs and the second customer interface 66 allows a customer to return or pickup DVDs. In this latter example, a number of additional components (such as a magnetic stripe reader for example) would be needed on the second customer interface 66 to allow the customer at this interface to pickup DVDs.

Also, although the above-description describes the simplified second customer interface 66 as comprising the second display 94 which may in the form of an LCD display, it is conceivable that the simplified second customer interface may comprise just a two-line display, for example. As another example, the simplified customer interface may comprise a single "GO" type of button which may be in the form of either software or hardware, for examples.

It should be apparent that a self-service media rental terminal having at least two customer interfaces allows more customers to be processed than otherwise with only one customer interface. The result is increased throughput of customers desiring to either rent and/or return DVDs.

Also, although the above-description describes the first and second customer interfaces 16, 18 disposed on opposite sides of the self-service media rental terminal 10, it is conceivable that the two interfaces be located on non-opposite sides of the terminal. As an example, a customer interface having full-functionality may be located on the front side of the terminal, and a customer interface having reduced-functionality may be located on either the left side or the right side of the terminal. It is also conceivable that both customer interfaces be located on the same side of the terminal.

Although the above-description describes entertainment media in the form of a DVD being returned, it is conceivable that other types of entertainment media may be returned. For example, the entertainment media may be in the form of a flash memory which stores entertainment data. As another example, the entertainment media may comprise optical media which is other than a DVD. Entertainment media may be of different technologies, different forms, or different sizes.

Further, although the above-description describes each of the readers 30, 80 being in the form of an RFID reader for reading data from returned DVDs, it is conceivable that each of the readers 30, 80 may in a different form. For example, each of the readers 30, 80 may comprise a bar code type of reader.

The above-description describes one embodiment of the present invention. It is conceivable that the self-service media rental terminal may be any type of device in a publicly accessible, unattended environment. Self-service media rental terminals are generally public-access devices that are designed to allow a customer to rent and/or return a media item (such as a bare DVD or a cased DVD) on which entertainment data is stored. Self-service media rental terminals typically include some form of tamper resistance so that they are inherently resilient.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service entertainment media rental terminal comprising:

a first customer interface for enabling a first customer to interact with the terminal to rent a media item on which entertainment data is stored from the terminal utilizing a first touch screen to select the media item and a card reader to pay for the media item;

a second customer interface for enabling a second customer to interact with the terminal to return a media item on which entertainment data is stored to the terminal utilizing a second touch screen;

a media storage bin for (i) storing media items to be dispensed when a customer rents a media item, and (ii) storing media items which have been returned from a customer;

a media transport mechanism arranged to (i) support movement of media items between the media storage bin and the first customer interface, and (ii) support movement of media items between the media storage bin and the second customer interface; and a controller arranged to (i) receive customer input data through the first customer interface, (ii) receive customer input data through the second customer interface while customer input data is being received through the first customer interface, and (iii) control operation of the media transport mechanism based upon the customer input data received through the first customer interface and customer input data received through the second customer interface, the controller programmed to drive the first touch screen to display transaction related information to allow customers to interact with the touch screen to conduct both rental transactions and return transactions, and to drive the second touch screen to display transaction related information to allow customers to interact with the second touch screen to conduct return transactions but not rental transactions.

2. A self-service entertainment media rental terminal according to claim 1, wherein (i) the first customer interface is disposed on one side of the terminal, and (ii) the second customer interface is disposed on another side of the terminal.

3. A self-service entertainment media rental terminal according to claim 2, wherein (i) the first customer interface is disposed on a front side of the terminal, and (ii) the second customer interface is disposed on a rear side of the terminal.

4. A self-service entertainment media rental terminal according to claim 3, wherein (i) the first customer interface comprises a predetermined functionality, and (ii) the second customer interface comprises a reduced functionality relative to the predetermined functionality of the first customer interface.

5. A self-service entertainment media rental terminal according to claim 4, wherein the controller controls the media transport mechanism to (i) both receive media from and dispense media to the first customer interface, and (ii) only receive media from the second customer interface.

6. A self-service entertainment media rental terminal according to claim 1, wherein the second touch screen displays a simplified display screen showing only one touch screen selectable choices.

7. A self-service entertainment media rental terminal according to claim 1, wherein the first touch screen comprises a single physical display having an upper portion displaying non-transaction related information including advertising and a lower portion displaying multiple touch-selectable transaction related choices.

8. A self-service entertainment media rental terminal according to claim 7, wherein the second touch display screen is physically smaller than the first touch screen, lacking the upper portion.

9. A self-service entertainment media rental terminal according to claim 1, wherein the first interface further comprises a digital download port.

10. A self-service entertainment media rental terminal for dispensing an entertainment media item to a customer who is renting the media item from the terminal and for receiving an entertainment media item from a customer who is returning the media item to the terminal, the self-service entertainment media rental terminal comprising:

a full-functionality customer interface for enabling a first customer to interact with the terminal to rent an entertainment media item from the terminal, as well as, to return an entertainment media item to the terminal;

a reduced-functionality customer interface for enabling a second customer to interact with the terminal to only return an entertainment media item to the terminal; and a controller arranged to (i) receive customer rental input data from a first customer via the full-functionality customer interface as the first customer is renting an entertainment media item from the terminal, (ii) receive customer return input data from a second customer via the reduced-functionality customer interface as the second customer is returning an entertainment media item to the terminal, wherein the customer rental input data being received at the full-functionality customer interface from the first customer and the customer return input data being received at the reduced-functionality customer interface from the second customer are being received at the same time.

11. A self-service entertainment media rental terminal according to claim 10, wherein (i) the full-functionality customer interface is disposed on one side of the terminal, and (ii) the reduced-functionality customer interface is disposed on another side of the terminal.

12. A self-service entertainment media rental terminal according to claim 11, wherein (i) the full-functionality customer interface is disposed on a front side of the terminal, and (ii) the reduced-functionality customer interface is disposed on a rear side of the terminal.

13. A self-service entertainment media rental terminal according to claim 11, wherein (i) the full-functionality customer interface enables a customer to either rent or return an entertainment media item while the customer is interacting with the full-functionality customer interface utilizing a first touch screen display which is driven by the controller to display screens including transaction related information for both rental and return as needed, and (ii) the reduced-functionality customer interface enables a customer to only return an entertainment media item while the customer is interacting with the reduced-functionality customer interface utilizing a second touch screen display which is driven by the controller to display only screens related to returns as needed.

14. A method of operating a self-service entertainment media rental terminal which is capable of dispensing a rented digital versatile disc (DVD) on which entertainment data and receiving a returned DVD on which entertainment data is stored, the method comprising:

receiving customer rental input data from a first customer desiring to rent a DVD from the terminal utilizing a first touch screen;

receiving customer return input data from a second customer desiring to only return a DVD to the terminal while the customer rental input data is being received from the second customer utilizing a second touch screen;

driving the first touch screen by a programmed controller to support full service customer interaction by displaying screens to allow customers to rent a DVD, to rent a pre-reserved DVD and to return a DVD; and driving the second touch screen display by the programmed controller to display screens allowing customers to only rent a pre-reserved DVD or to return a DVD, but not to rent a non pre-reserved DVD.

15. A method according to claim 14, further comprising:

receiving customer pre-reserve input data through the reduced-functionality customer interface from a third customer desiring to rent a pre-reserved DVD from the terminal while the customer rental input data is being received from the first customer and after the customer return input data has been received through the reduced-functionality customer interface from the second customer.

* * * * *